May 26, 1959 R. J. KOPF 2,887,925
DEFORMABLE COLLAR FASTENER FOR POWDER-ACTUATED TOOLS
Original Filed May 28, 1954
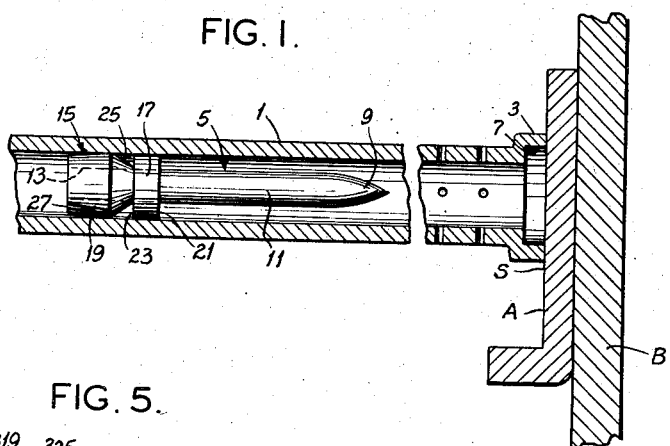
FIG. 1.
FIG. 2.
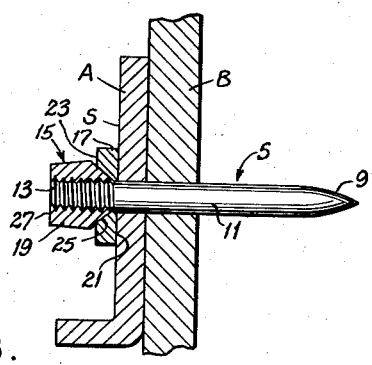
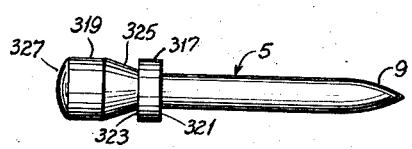
FIG. 5.
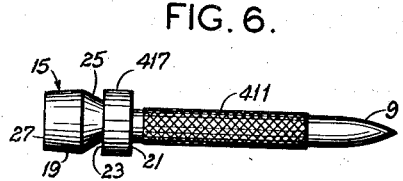
FIG. 6.
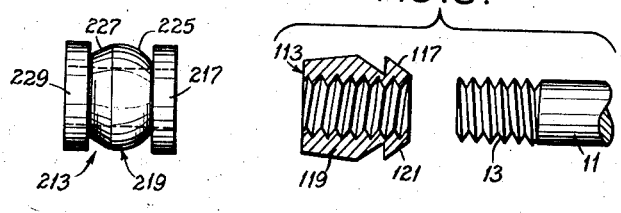
FIG. 4.
FIG. 3.
INVENTOR:
ROWLAND J. KOPF,
BY Bruninga and Sutherland,
ATTORNEYS.

United States Patent Office 2,887,925
Patented May 26, 1959

2,887,925

DEFORMABLE COLLAR FASTENER FOR POWDER-ACTUATED TOOLS

Rowland J. Kopf, Rocky River, Ohio, assignor, by mesne assignments, to Olin Mathieson Chemical Corporation, a corporation of Virginia Continuation of application Serial No. 432,970, May 28, 1954. This application June 21, 1954, Serial No. 438,042

3 Claims. (Cl. 85—10)

This invention relates generally to powder-actuated tools, and more particularly, to the fasteners and fastener components used with such tools.

This application is a continuation of my copending application, Serial No. 432,970, filed May 28, 1954, and now abandoned.

Powder-actuated tools of the type with which the invention is concerned utilize a blank cartridge to embed an elongate fastener in such materials as concrete and steel. Heel caps and gas checks are frequently used behind the fastener to increase the area exposed to the propellent gases, and in some instances, the fastener is carried and guided by a relatively wider sabot which is affixed to the rear shank portion of the fastener. If the fastener is driven with sufficient power, such a sabot may also serve as a head for tightly securing parts in assembly and for preventing overpenetration, it being understood that the degree of penetration is otherwise somewhat uncertain.

When a fastener of this type is fully driven home, however, it is often found that the area of contact between the sabot and the work surface is inadequate for holding purposes or that the work surface has been deformed by partial penetration of the sabot. The diameter of the sabot is necessarily limited by the caliber of the barrel, and while these difficulties can be alleviated to some extent by placing a so-called disk at the muzzle end of the tool for penetration by the fastener, this expedient is not entirely satisfactory. It is accordingly an object of this invention to provide an improved sabot, which is adapted, in part, to upset and expand upon contact with the work material, thereby providing a larger area of contact and preventing deformation of the work surface.

Briefly, I provide a sabot having a collar portion of soft material, followed by a head portion of larger mass, which is formed with a forwardly-facing ramp or bevel. The head portion is secured to the body of the fastener, as by threads, so that when the fastener is fully driven into the work material, the collar is compressed between the head and work surface, and thereby expanded on the ramp. Both the collar and the head portions are preferably of an outer diameter such as to fit closely with the bore of the barrel, but the bore may be enlarged at the muzzle to permit radial expansion of the soft collar when the tool is held against the work surface. Although the collar portion need not be fastened per se to the body of the fastener, it should be carried thereby, as by integral connection with the head portion. In a preferred embodiment, the sabot is made by undercutting or notching a generally cylindric, interiorly-threaded member of soft iron, aluminum, or plastic, such as nylon, the notch being near one end of the member and to within two-thousandths of an inch of the threads.

Other features of the invention will be in part apparent from and in part pointed out in the following detail description taken in connection with the accompanying drawings, in which:

Fig. 1 is a diagrammatic sectional view illustrating parts of a powder-actuated tool and fastener embodying the invention;

Fig. 2 is a sectional view similar to that of Fig. 1, but showing the fastener after it has been driven;

Fig. 3 is an exploded detail view of a fastener and sabot illustrating an alternative embodiment of the invention;

Fig. 4 is a plan view of a modified form of sabot;

Fig. 5 is a plan view of a fastener showing another form of sabot; and

Fig. 6 is a view similar to that of Fig. 5, but showing a different type of fastener and sabot.

It will be understood that powder-actuated tools are used to embed fasteners of different types in a wide variety of materials. The tool consists basically of a barrel 1 for receiving a blank cartridge (not shown) and a fastener 5, which may be secured to the cartridge to form a unit load or which may be a discrete element. In firing, the muzzle 3 of the barrel is held against the work surface as shown in Fig. 1.

Frequently, the muzzle is counterbored or formed with a recess 7 of a diameter somewhat larger than that of the normal bore for the purpose of receiving a disk through which the fastener is driven. The disk serves to increase the area of contact with the work, but is not secured to the fastener. For actual holding power, it is preferable to rely upon a head secured to the body of the fastener, but it will be apparent that the size of the head is limited by the bore of the barrel and hence may be inadequate for fastening purposes. Moreover, a small hard head tends to embed partly in and deface the work surface if used to prevent overpenetration in soft materials. Such defacing is especially not desired when the head is in the form of a threaded sabot, which is removed after the body of the fastener is embedded.

Whereas the disk referred to above serves to limit penetration, its use is somewhat inconvenient in that it must be manufactured and handled as a separate item. The fastener proper is usually formed by pointing a rod-like member, and in some instances, threading its other end to receive a sabot. The sabot carries the fastener before and during firing, serving in unit loads as a connection between the fastener and the cartridge case. It also guides the fastener in its passage through the barrel bore and provides an increased area exposed to the propellent gases, thus permitting the use of lower pressures to achieve a given penetration. The fastener normally is of a diameter smaller than that of the bore and cartridge, hence the sabot may also be tapered at its forward end so that it will pass easily into the chamber.

In some fastener-setting applications, the sabot is not driven down against the work or disk, but when the sabot is driven home, the tapered or ogival front section thereof will partly penetrate the work or disk, giving the appearance of an undercut in the finished fastening and also resulting in only a relatively small area bearing against the work.

Referring now to the drawings, there is disclosed an improved sabot that does not have these objections. The fastener comprises the usual body, which is formed with a pointed nose 9 followed by an elongate shank 11, and the rearmost portion of the shank is threaded at 13 to receive an interiorly-threaded sabot 15. Usually, the sabot is merely a head-like element, but in accordance with this invention, the sabot is in concept a two-part element, a front portion 17 having the appearance of a collar and a rear portion 19 having the appearance of a separate tapering-front head.

In the embodiment of Figs. 1 and 2, the front face 21 and rear face 23 of the collar portion 17 are perpendicular to the axis of the fastener body. On the other hand, the head portion 19 is provided with a beveled surface 25 adjacent the collar, and its rear surface 27 may be of varying shape, the embodiment disclosed in Figs. 1 and 2 being flat at the rear. Ideally, the collar should be relatively soft (plastic flow property) and free to move axially rearward on the shank of the fastener, whereas the head should be a relatively larger mass of harder material, which is fixed to the shank. Satisfactory performance is had, however, where the entire element is integral, i.e. formed by notching an interiorly-threaded member of soft iron or aluminum, this procedure being economical. Other materials may be used, however, among which may be mentioned polyethylene, nylon, and polymer plastics of similar properties. The notch defined by surfaces 23 and 25 is cut very close to the interior threads 13, as for example, to within two-thousandths of an inch, and is located so that the head 19 is of a length substantially greater than that of the collar 17.

The fastener may be used with conventional powder-actuated tools, but preferably is used in tools of the type having a counterbore 7 at the muzzle end, many commercial tools having such a counterbore for reception of a so-called disk. The fastener may be supplied as a part of a unit load, in which the cartridge is crimped over the head portion, or it may be an element separate from the cartridge.

Figs. 1 and 2 illustrate use of the fastener to secure an angle bracket A to a steel plate B. The shank 11 of the fastener embeds in the steel plate B, but when the collar 17 contacts the work surface S, it is forced rearwardly over the bevel 25 and thereby expanded by plastic flow within the counterbore 7. In this way, the area of contact is increased and the fastening connection accordingly strengthened.

It should be understood, however, that the fastener may also be used with a disk, or possibly with a tool which does not have a muzzle enlargement, in which event, the collar does not expand radially, but does protect the work surface from partial indentation by the tapering portion 25 of the head. The tapering surface 25 may be desired, apart from its expanding effect, for example, to facilitate handling fasteners and to simplify manufacture of unit loads.

Referring to Fig. 3, there is shown an alternative embodiment of a sabot 113 wherein the collar 117 tapers forwardly at 121, this shape being in some instances desirable for purposes of feeding fasteners into the barrel of the tool. It will be understood that a tool may be provided with repeat feeding mechanism or magazines in conjunction with a feed ramp, as in autoloading weapons. The head portion 119 is otherwise similar to that described heretofore.

Other modifications of the invention will be apparent to those skilled in the art. For example, Fig. 4 discloses a sabot 213 having a collar portion 217 similar to that described heretofore, but having a head portion 219 formed with a rounded front surface 225 and a slightly tapering rear portion 227. This tapering rear portion 227 is followed by a second collar-like element 229.

Fig. 5 illustrates an embodiment similar to that disclosed in Fig. 1, but wherein the head 319 has a relatively long bevel 325 and a rounded rear face 327. In Fig. 6, the shank portion 411 of the fastener is shown to be knurled and the collar portion 417 is somewhat thicker than those heretofore shown.

From the foregoing description, it is apparent that those skilled in the art will understand the structure, function and mode of operation of the invention herein disclosed, and appreciate the advantages thereof. Although several embodiments have been disclosed in detail, it is to be understood that the invention is not limited thereto, but the drawings and description thereof are to be understood as being merely illustrative. It is realized that many modifications and variations will present themselves to those skilled in the art without departing from the spirit of this invention or the scope thereof as set forth in the appended claims.

Having thus described the invention, what is claimed and desired to be secured by Letters Patent is:

1. A fastener driving tool of the character described comprising a stud having an elongate shank formed with a point at its forward end and a sabot at its other end, said sabot being of relatively larger diameter than that of said shank and having an exterior annular groove which extends nearly completely through said sabot except for a relatively thin connecting portion and which defines a front collar and integral back head of equal outer diameter, the back head being of an axial dimension greater than that of said collar, the back head further having an exterior front face tapering inwardly in the direction of said collar and said collar having a transversely extending back face so that the front face of the head extends to a depth substantially identical with said extension of said groove and tends to expand the collar radially when the head collar is moved forwardly relative to the collar, and said sabot being formed of a substantially incompressible deformable material having the property of plastic flow, whereby said collar is expanded by the head when the collar is forced back onto at least a part of said front face of the head upon engagement with the work material into which the fastener is driven.

2. A fastener as set forth in claim 1, wherein the front face of the collar is also tapering.

3. A fastener as set forth in claim 1, wherein the back end of the stud is threaded, the sabot being interiorly threaded throughout substantially the entire length of its head portion and being screwed upon said stud.

References Cited in the file of this patent

UNITED STATES PATENTS

| | | |
|---|---|---|
| 1,388,363 | Miller | Aug. 23, 1921 |
| 2,520,259 | Pummill | Aug. 29, 1950 |
| 2,575,079 | Temple | Nov. 13, 1951 |
| 2,666,252 | Temple | Jan. 19, 1954 |
| 2,722,003 | Erickson | Nov. 1, 1955 |
| 2,722,004 | Webber | Nov. 1, 1955 |
| 2,724,116 | Termet | Nov. 22, 1955 |
| 2,740,965 | Phillips | Apr. 10, 1956 |
| 2,761,348 | Williams | Sept. 4, 1956 |

FOREIGN PATENTS

| | | |
|---|---|---|
| 1,028,377 | France | Feb. 25, 1953 |
| 518,452 | Belgium | Mar. 31, 1953 |
| 697,129 | Great Britain | Sept. 16, 1953 |
| 1,055,269 | France | Oct. 14, 1953 |
| 519,586 | Belgium | Oct. 29, 1953 |

(Corresponding to U.S. No. 2,761,348, Sept. 4, 1956)